Dec. 30, 1947.  HENRI-GEORGES DOLL  2,433,746
METHOD AND APPARATUS FOR INVESTIGATING EARTH
FORMATIONS TRAVERSED BY A BOREHOLE
Filed June 13, 1942  4 Sheets-Sheet 1
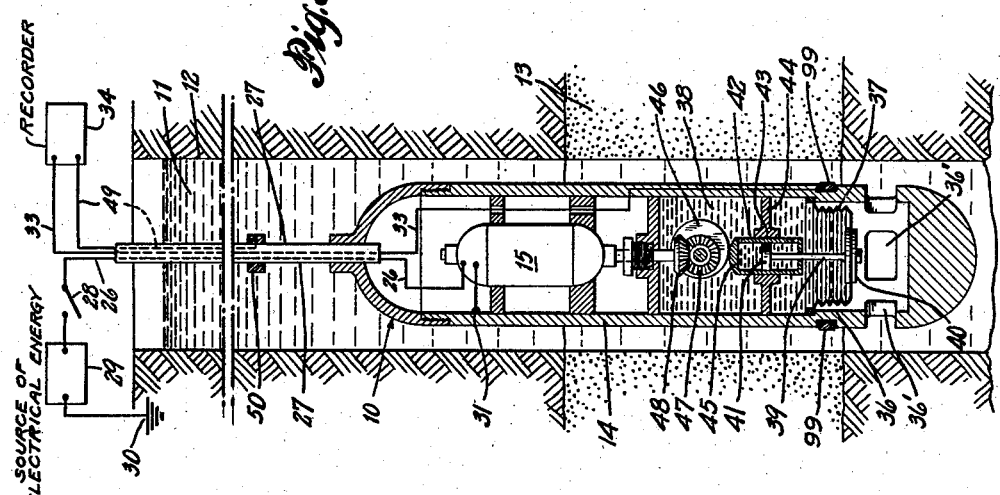
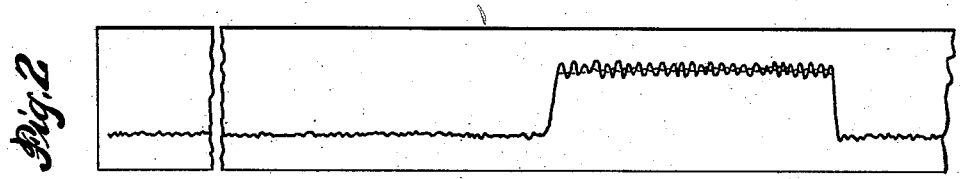
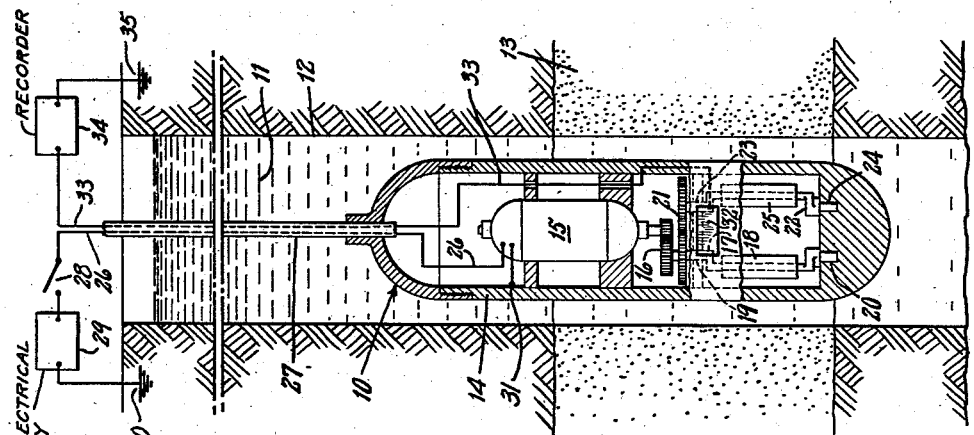
INVENTOR
Henri-Georges Doll
BY
Hoguet, Neary & Campbell
ATTORNEYS.

INVENTOR
Henri-Georges Doll
BY
ATTORNEYS

Dec. 30, 1947.     HENRI-GEORGES DOLL     2,433,746
METHOD AND APPARATUS FOR INVESTIGATING EARTH
FORMATIONS TRAVERSED BY A BOREHOLE
Filed June 13, 1942     4 Sheets-Sheet 3
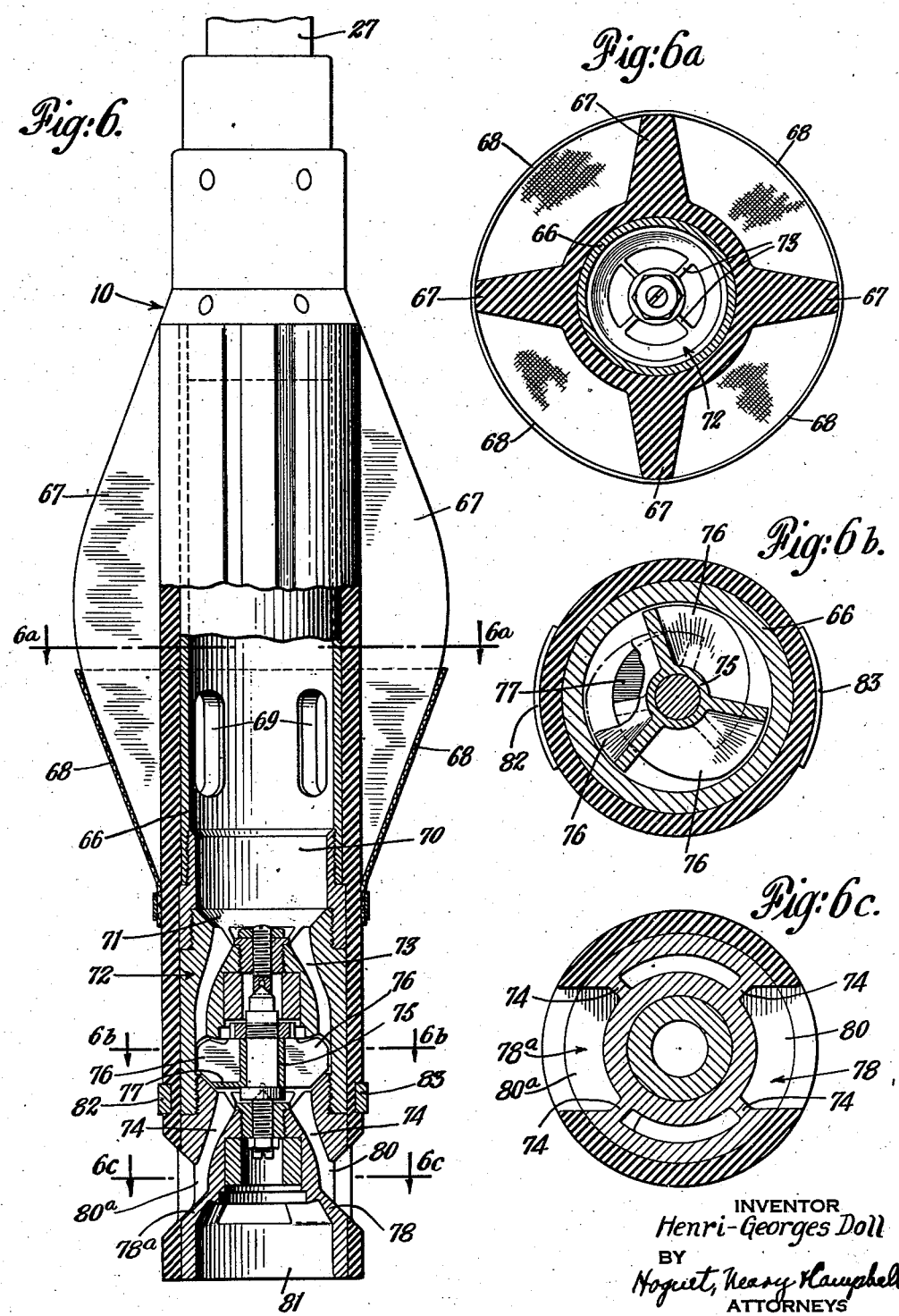
INVENTOR
Henri-Georges Doll
BY
Hoguet, Neary & Campbell
ATTORNEYS Dec. 30, 1947.    HENRI-GEORGES DOLL    2,433,746
METHOD AND APPARATUS FOR INVESTIGATING EARTH
FORMATIONS TRAVERSED BY A BOREHOLE
Filed June 13, 1942    4 Sheets-Sheet 4
Fig: 7.
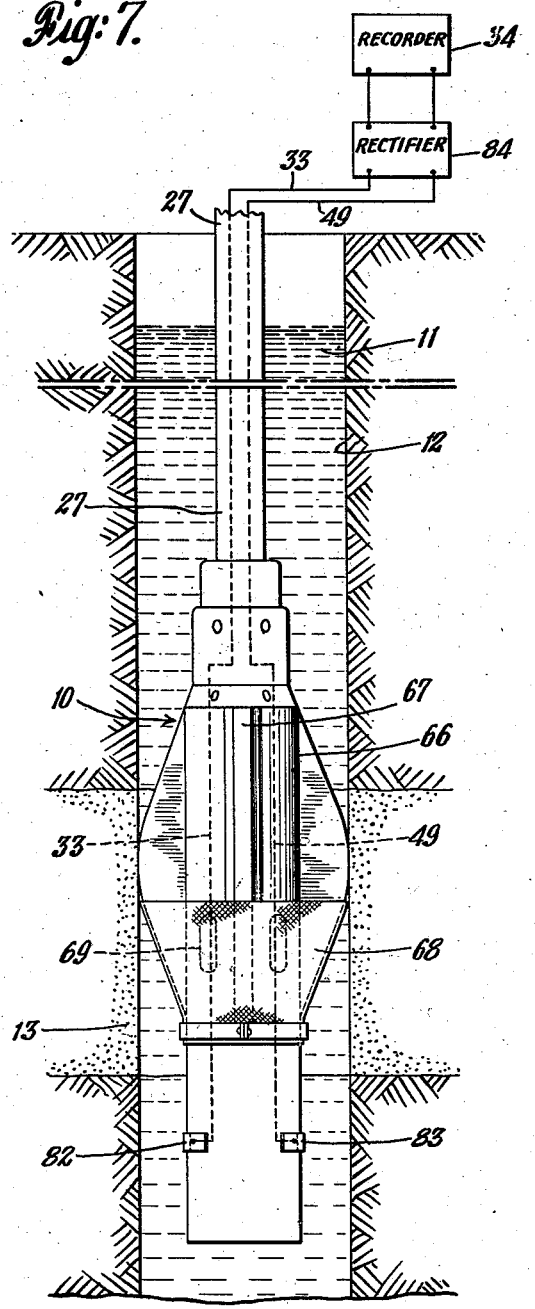
Fig: 8.
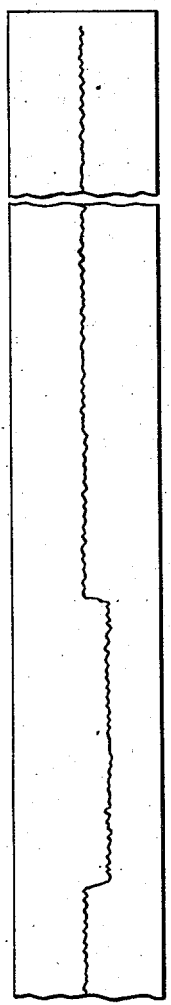
INVENTOR
Henri-Georges Doll
BY
Hoguet, Neary & Campbell
ATTORNEYS Patented Dec. 30, 1947

2,433,746

UNITED STATES PATENT OFFICE 2,433,746

METHOD AND APPARATUS FOR INVESTIGATING EARTH FORMATIONS TRAVERSED BY BOREHOLES

Henri-Georges Doll, Houston, Tex., assignor to Schlumberger Well Surveying Corporation, Houston, Tex., a corporation of Delaware Application June 13, 1942, Serial No. 446,888

2 Claims. (Cl. 175—182)

The present invention relates to methods and apparatus for investigating earth formations traversed by a bore hole, and more particularly to a new and improved method and apparatus for determining the depth and thickness of permeable formations traversed by a bore hole.

In the present practice, the location and vertical extent of permeable formations traversed by a bore hole are usually determined by "well logging" methods of the type disclosed in prior Patent No. 1,913,293 to Conrad Schlumberger. According to the method described in that patent, indications are obtained of naturally occurring potentials between an electrode moved through the bore hole and a suitably chosen point of reference. These naturally occurring potentials are continuous potentials of variable magnitude which are known to be indicative of the permeability of the surrounding formations.

Naturally occurring potentials in a bore hole containing a column of liquid generally include potentials produced by electrochemical effects and potentials produced by the phenomenon known as electrofiltration. Most bore holes encountered in practice contain a column of liquid or drilling mud which is an electrolyte. The reactions between this electrolyte, the materials comprising the surrounding formations, and other electrolytes contained in such formations partly account for the electrochemical potentials that exist in the bore hole.

The infiltration of the bore hole liquid into porous or permeable formations in which the fluid pressure is lower than the bore hole liquid pressure gives rise to a flow of electric current in the same direction as the flow of liquid. This current flow produces potentials in passing through the electrolyte or electrolytes present in the vicinity of the permeable formations. These potentials constitute another component of naturally occurring potentials in a bore hole.

In addition to the two component potentials referred to above, there may sometimes be other continuous potentials present which are not related to the permeability of the formations. Spurious potentials of this nature are generally found where there are relatively large telluric currents flowing through the earth in the vicinity of the well which is being logged. In such cases great care must be exercised in practicing prior art methods in order to obtain accurate results.

Patent No. 1,913,293 points out the conditions under which potentials are encountered in the bore hole in the method therein described. It also points out that under the established operating conditions encountered in the field and now well known in the art the electrofiltration potential is proportional to the pressure causing such filtration.

It is an object of the invention, accordingly, to provide for use under the conditions in the field disclosed in said Patent No. 1,913,293 a novel method and apparatus for obtaining indications in a bore hole, of naturally occurring potentials that are related to the permeability of the formations, apart from other spurious potentials that may be present. These potentials are now referred to in the art as electrofiltration potentials or streaming potentials and have been widely employed for more than ten years to locate permeable strata in situ traversed by a drill hole.

Another object of the invention is to provide a novel method and apparatus for modifying the characteristics of electrofiltration potentials as they have been found to exist in bore holes whereby they may be readily distinguished from other continuous potentials that may exist in the bore hole.

A further object of the invention is to provide a novel method and apparatus of the above character by virtue of which indications may be obtained of electrofiltration potentials existing in a bore hole containing a column of liquid.

Another object of the invention is to provide a novel method and apparatus of the above character for transmuting continuous electrofiltration potentials in a bore hole into periodically variable potentials which may be readily distinguished from other undesired potentials that may be present.

A still further object of the invention is to provide a novel apparatus for producing, in situ, periodic variations in the pressure of the liquid contained in a bore hole for the purpose of producing periodically variable electrofiltration potentials therein.

Still another object of the invention is to provide a novel method and apparatus for simultaneously obtaining indications of periodically variable electrofiltration potentials and at least one other electrical value related to a different subject of interest in a bore hole.

The invention is based, in part, on the fact that the electrofiltration potentials existing in a bore hole at the level of a permeable formation are related to the permeability of the formation and are a function of the difference in pressure between the bore hole liquid at the level of the formation and the fluid contained in the formation.

According to well known electrokinetic phenomena, an applied E. M. F. produces an electroosmotic flow of liquid in a capillary tube, a phenomenon known as electro-osmosis. If the procedure is reversed and a pressure is applied, an E. M. F. is produced. Since these potentials may be visualized as a result of fluid flow, they are called "electrofiltration" or "streaming" potentials. For any given liquid and porous material the streaming potential E is directly proportional to the pressure differential. This relation may be expressed as $$E = \frac{gPD}{4\pi nk}$$

where $g$ is the potential of the double layer at the solid-fluid contact, $P$ is the pressure differential, $D$ is the dielectric constant, $n$ is the viscosity, and $k$ the specific conductivity.

Experiments have shown that the streaming potentials are a linear function of the pressure (page 459, Experimental and Theoretical Electrochemistry, by Dole, McGraw-Hill, 1935).

In terms of oil field practice, the filter cake formed on the wall of the bore hole opposite a permeable formation together with that formation itself constitute the porous material or system of capillaries, and the bore hole fluid is the liquid. It follows then that if the pressure P is periodically varied, a corresponding variation will be noted in the potential E. In accordance with this principle and the present invention, if the pressure is varied rapidly enough to produce a fluctuating streaming potential, this variable potential may be considered as an alternating potential. Then for practical purposes the provoked streaming potentials may appear as A. C. and the previously existing natural potentials as D. C., upon which basis they may be separated. A condenser in series in the measuring circuit would block the natural potentials and pass the provoked streaming potentials. Preferably a filter is included or substituted to block A. C. currents of frequencies other than that of the vibration frequency.

According to the invention, a periodic and localized variation in the pressure of the bore hole liquid is produced at different depths in the bore hole. Whenever the variation in pressure occurs in the vicinity of a relatively permeable formation in which the fluid pressure is different from the bore hole liquid pressure, a corresponding periodic variation in the potential caused by electrofiltration is observed. The component caused by electrochemical action, however, is apparently not changed by the modification of the pressure of the bore hole liquid. The periodically varying electrofiltration potential, therefore, may be readily measured in any suitable manner, apart from any other continuous potentials that may be present.

The invention thus enables accurate indications of electrofiltration potentials to be obtained in a bore hole with ease, even where there are relatively strong telluric currents present. Furthermore, the periodically variable electrofiltration potentials may be transmitted from different locations in the bore hole to measuring apparatus at the surface of the earth through a common conductor, simultaneously with direct current, or different frequency alternating current, indications of another object of interest in a bore hole. The other subject of interest may be, for example, the electrical resistivity of the formations at different depths, obtained in accordance with the method disclosed in prior Patent No. 1,819,923 or any other electrical characteristic of the formations.

The invention may be better understood from the following detailed description taken in conjunction with the accompanying drawings, in which:

Fig. 1 is a schematic diagram in longitudinal section of apparatus constructed according to the invention for producing periodically variable potentials related to electrofiltration potentials in a bore hole;

Fig. 2 illustrates a curve of spontaneous potentials such as might be obtained by means of the apparatus shown in Fig. 1;

Fig. 3 is a schematic diagram of a modified form of apparatus constructed according to the invention;

Fig. 6 is a schematic diagram in longitudinal section of a further modification of the invention utilizing a liquid operated turbine in the bore hole for producing pressure variations therein;

Fig. 6a is a view in section taken along line 6a—6a of Fig. 6 and looking in the direction of the arrows;

Figure 9:
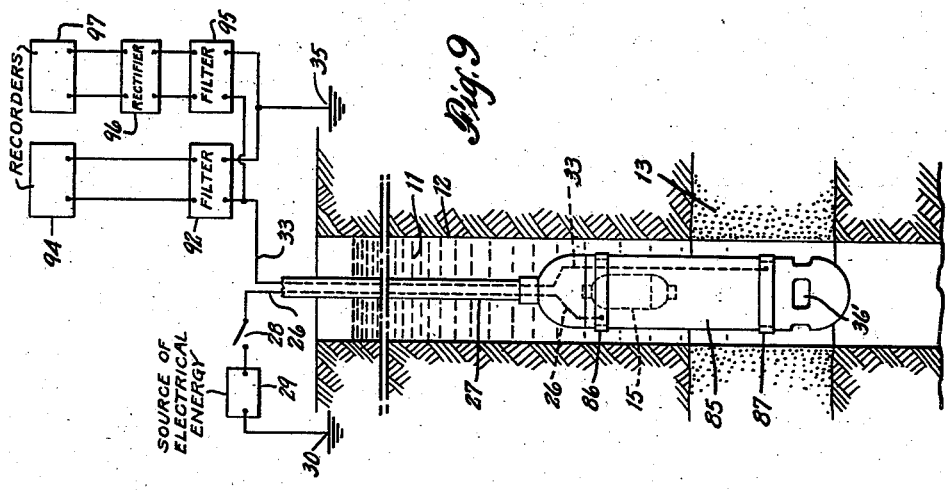

Figs. 6b and 6c are sectional views of a portion of the apparatus shown in Fig. 6, taken along lines 6b—6b and 6c—6c, respectively, and looking in the direction of the arrows;

Fig. 7 shows the apparatus of Fig. 6 in position in a bore hole and illustrates schematically the electrical connections employed;

Fig. 8 shows an illustrative curve which might be obtained with the apparatus of Figs. 6 and 7; and Fig. 9 is a schematic diagram of apparatus constructed according to the invention for simultaneously obtaining indications of alternating electrofiltration potentials and of another subject of interest in a bore hole.

Referring now to Fig. 1, the invention is shown embodied in apparatus 10 for producing periodic variations in the pressure of the liquid 11 at the level of a relatively permeable formation 13 traversed by a bore hole 12. It will be assumed in the following description that the pressure of the bore hole liquid 11 is different from the pressure of any fluid contained in the formation 13, so that electrofiltration potentials will be present in accordance with the method disclosed in Patent No. 1,913,293. The apparatus 10 comprises preferably a cylindrical water-tight casing 14 containing an electric motor 15 which is adapted to drive, through conventional type gearing 16, a crank arm 17 on which is mounted a weight 18. The crank arm 17 is mounted in suitable bearings 19 and 20 for rotation about a vertical axis.

The crank arm 17 drives, through conventional gearing 21, a second crank arm 22, journalled in suitable bearings 23 and 24 for vertical rotation within the casing 14 and having a weight 25 mounted thereon. It will be noted that the gearing 21 causes the crank arms 17 and 22 to rotate in opposite directions, when the motor 15 is in operation.

One terminal of the motor 15 is connected to a conductor 26 in the supporting cable 27, the upper end of which is connected in series with a conventional type switch 28 and a suitable source of electrical energy 29, the other terminal of which is connected to ground at the point 30 at the surface of the earth. The energizing circuit for the motor 15 is completed through the earth and the bore hole liquid 11 and to this end its other terminal is grounded to the body of the apparatus 14 at the point 31. If any interference is encountered between the current and the recording circuits, it may be desirable to use a second conductor in the cable 27 instead of the ground return.

In operation, the switch 28 at the surface of the earth is closed and the apparatus 10 is moved through the bore hole 12. This energizes the motor 15, causing it to drive the crank arms 17 and 22 in opposite directions. The result of this rotation of the weights 18 and 25, respectively, on the crank arms 17 and 22, respectively, is to impart an extremely vigorous vibrating motion to the apparatus 10 in a plane perpendicular to the paper. This vigorous vibration produces periodic increases and decreases in the pressure of the bore hole liquid at opposite sides of the apparatus 10. The apparatus described may, for example, create such periodic increases and decreases in pressure at a frequency of 600 cycles per second. Measurable potentials have been obtained in the laboratory with frequencies as high as 30,000 per second. These frequencies are referred to merely by way of example because the principle of operation is not limited by the frequencies employed, so far as is known and believed. Limitations of operativeness of the apparatus employed in connection with the practice of the method may, of course, impose practical limitations, as is to be expected in the mechanical and electrical arts.

As described above, the periodic variation in the pressure of the bore hole liquid 11 as the apparatus passes the formation 13 produces a corresponding periodic variation in the electrofiltration potentials existing in the bore hole 12 in the vicinity of the porous formation 13. These electrofiltration potentials may be measured in any desired manner by any suitable apparatus. Such apparatus may comprise, for example, a relatively small, insulated electrode 32 of any desired shape, mounted on the outside of the casing 14, preferably on a radius perpendicular to a line passing through the centers of the bearings 19 and 23. The electrode 32 may be connected through a conductor 33 in the supporting cable 27 to one terminal of a conventional alternating current potential indicating instrument 34, preferably of the recording type, the other terminal of which may be connected to a ground point 35 at the surface of the earth.

A representative curve such as might be obtained by the recording apparatus 34 is shown in Fig. 2, from which it appears that the spontaneous potential curve is modulated in the vicinity of the porous formation 13 at the frequency of vibration of the apparatus 10 in the bore hole. The normal spontaneous potential curve, such as might be obtained with the switch 28 open, is shown in dotted lines for purposes of comparison.

In the embodiment shown in Fig. 3 of the drawings, the casing 14 is provided with an opening 36 at the lower end thereof, in which is mounted a conventional "Sylphon" bellows 37. The "Sylphon" bellows 37 and the lower portion of the casing 14 constitute a closed chamber 38 which is preferably filled with a substantially incompressible liquid such as oil, for example, which serves to equalize the relatively great pressure of the bore hole liquid 11 contained in the bore hole 12.

The variation in pressure of the bore hole liquid 11 is produced by periodically reciprocating the "Sylphon" bellows 37 by means of a shaft 39. The lower end of the shaft 39 is secured to the lower closure member 40 of the "Sylphon" bellows 37 and its upper end is connected to the piston 41 of a conventional type dashpot 42 which is slidably mounted in a bore 43 formed in a support 44 mounted in the casing 14. The upper closure member 45 of the dashpot 42 engages a cam member 46 rotatably mounted within the casing 14 and provided with a gear 47 which is driven by a corresponding gear 48 mounted on the shaft of the motor 15. The purpose of the dashpot 42 is to permit the "Sylphon" bellows 37 to assume a position for which the pressure in the chamber 38 will be equal to the pressure of the bore hole liquid 11.

When the switch 28 at the surface of the earth is closed, the motor 15 is energized, causing the cam 46 to rotate and periodically reciprocate the dashpot 42. The action of the dashpot 42 is such that it does not respond to the rapid reciprocating motion produced by the cam 46. Accordingly, the reciprocatory motion produced by the cam 46 is directly transmitted to the shaft 39, so that the "Sylphon" bellows 37 is reciprocated at a rate determined by the speed of rotation of the motor 15.

Since the "Sylphon" bellows 37 is in communication with the bore hole liquid 11 through suitable apertures 36' formed in the lower extremity of the casing 14, its reciprocatory motion produces periodic variations in the pressure of the bore hole liquid 11 in the vicinity of the permeable formation 13. The periodically varying electrofiltration potentials thus produced may be measured in essentially the same manner as described above in connection with Fig. 1. Or, if desired, the recorder 34 may be connected through a third conductor 49 in the supporting cable 27 to an electrode 50 mounted a relatively short distance above the electrode 99.

Figure 4:
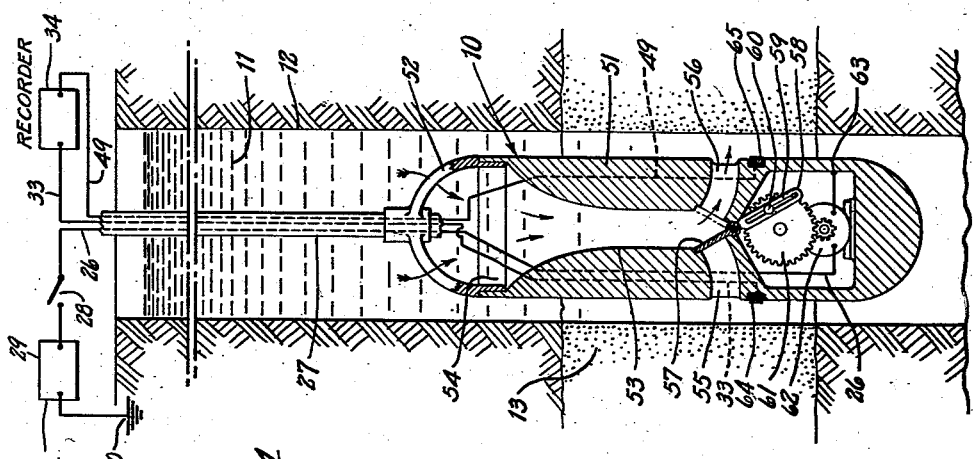
Fig. 4 illustrates schematically a further embodiment of the invention.

Periodic variations in the pressure of the bore hole liquid 11 may also be produced by directing jets of liquid periodically in opposite directions toward the wall of the bore hole 12. Apparatus suitable for this purpose is shown in Fig. 4 of the drawings. Referring to that figure, the apparatus comprises a casing 51 suspended on a conventional type bail 52 secured to the supporting cable 27 in the bore hole 12. Mounted in the upper portion of the casing 51 is a downwardly extending conduit 53 having a large mouth 54. The conduit 53 converges downwardly and divides into two oppositely directed conduits 55 and 56 located in the lower portion of the casing 51.

At the junction of the conduits 55 and 56 is mounted a conventional type clapper valve 57 which is adapted to be moved periodically from the position shown in full lines to the position shown in dotted lines in the drawing. This may be accomplished in any suitable manner, as, for example, by mounting an arm 58 having a longitudinal slot 59 therein on the shaft of the clapper valve 57. Within the slot 59 is adapted to be received a pin 60 secured on a rotatable disc 61 driven by a conventional type electric motor 62. One terminal of the motor 62 is connected to the conductor 26 in the supporting cable and its other terminal is grounded to the casing 51 at the point 63.

In operation, the switch 28 is closed at the surface of the earth, supplying electrical energy from the source 29 to the electric motor 62. The disc 61 begins to rotate and moves the clapper valve 57 periodically from the position shown in heavy lines to that shown in dotted lines. Meanwhile, the casing 51 is moved upwardly through the bore hole by applying tension to the supporting cable 27 so that the bore hole fluid 11 is directed through the conduit 53 and alternately through the conduits 55 and 56.

The jetting action of the bore hole fluid 11 produced in its passage through the diametrically opposite conduits 55 and 56 produces a vigorous lateral vibration of the casing 51 and alternately compresses the bore hole liquid 11 in the vicinity of the outlets of the conduits 55 and 56. As described above, the periodic variation in the pressure of the bore hole liquid 11 is accompanied by corresponding variations in the electrofiltration potentials existing in the vicinity of permeable formations.

These potential variations may be picked up as described above or by measuring the potential difference between two insulated electrodes 64 and 65 located on opposite sides of the casing 51 in the vicinity of the conduits 55 and 56. The electrodes 64 and 65 may be connected to the conductors 33 and 49 in the supporting cable and the potential differences picked up are measured by the recording apparatus 34 at the surface of the earth.

Figure 5:
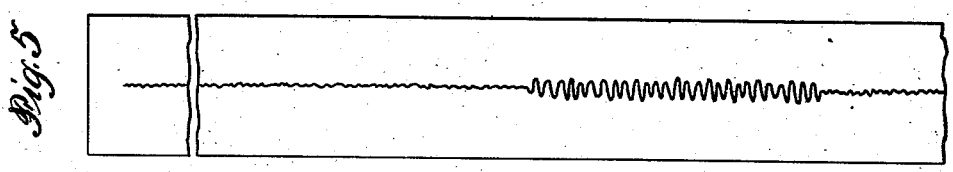
Fig. 5 shows a curve of spontaneous potentials such as might be obtained by means of the apparatus shown in Fig. 4.

A representative curve, such as might be obtained with the apparatus shown in Fig. 4, is illustrated in Fig. 5 of the drawings. As shown in this figure, the curve of spontaneous potentials at the level of relatively permeable formations has approximately a sinusoidal shape and its frequency is the same as the frequency of vibration of the apparatus in the bore hole.

Comparison of Figures 2 and 5 shows that at least two types of curves may be produced by employing this invention: first, a curve which represents values related to electrochemical potentials as well as electrofiltration potentials, as shown in Figure 2, and second, a curve which indicates values corresponding only to electrofiltration potentials, as indicated in Figure 5.

Referring again to Figure 4, it will be noted that the recorder 34 indicates the difference in potential between electrodes 64 and 65 which are positioned at the same depth in the bore hole but on opposite sides of the sonde. The electrochemical potential and other natural potentials appearing on each of the electrodes 64 and 65 are therefore the same, so that they do not appear in a measuring circuit; the only potentials measured by recorder 34 are the variations in streaming potentials between electrodes 64 and 65 produced by the vibration of the bore hole equipment.

In the embodiment illustrated in Fig. 6 of the drawings, a hydraulic turbine is employed to produce periodic variations in the pressure of the bore hole liquid at different depths in the bore hole. Referring to Fig. 6, the apparatus comprises a casing 66 at the upper extremity of which are mounted a plurality of flexible fins 67 which serve to maintain the casing 66 in fixed relation to the axis of the bore hole 12. Although any desired number of fins 67 may be used, preferably four are provided, which are disposed 90° apart, as shown in greater detail in Fig. 6a, and they may be made of any suitable resilient material, such as rubber or neoprene, for example.

Secured to the lower portions of the flexible fins 67 are a plurality of flaps 68 made of any suitable material, such as canvas, for example, which extend between the outer edges of adjacent fins 67, as shown, to form a funnel for directing the bore hole liquid 11 to a plurality of fluid inlets 69 formed in the casing 66. It will be noted that when the casing 66 is lowered into the bore hole 12 the canvas flaps 68 will be collapsed by the movement of the casing 66 through the bore hole liquid 11. On the other hand, when the casing 66 is raised in the bore hole the flaps 68 will be expanded into the operative position, forming a large funnel as shown in the drawings.

The fluid inlets 69 in the casing 66 communicate with a chamber 70, which in turn communicates with the inlet port 71 of a conventional type hydraulic turbine 72. The turbine 72 comprises two sets of stator blades 73 and 74 between which is rotatably mounted a rotor 75 having a plurality of blades 76 mounted thereon.

In order to provide for periodic pressure variations in the bore hole liquid 11, a bottom closure member 77 is provided between two adjacent blades 76 on the turbine rotor 75, as shown in greater detail in Fig. 6f. Also, similar bottom closure members 78 and 78a are provided between two pairs of adjacent fixed blades 74 below the rotor 75 and outlets 80 and 80a are formed directly opposite the two pairs of adjacent blades 74 which have been so closed off. While the device will function with only one outlet 80, it is preferable to provide two in order to increase the vibrational energy imparted to the bore hole liquid. It is also desirable to have one or more less blades on the rotor 75 than there are stator blades 74. With this construction, the closure member 77 on the rotor 75 subtends a greater arc than the passages between the blades 74 to which the bottom closure members 78 and 78a are secured, and reduces to a minimum any leakage from the outlets 80 and 80a when the rotor bottom closure member 77 lies over the stator blades 74 to which the closure members 78 and 78a are secured.

In operation, the casing 66 is lowered to the bottom of the bore hole on the supporting cable 27. While it is being lowered, the flaps 68 between the fins 67 are collapsed so that they do not impede the movement of the apparatus in the bore hole. The apparatus is then raised, whereupon the flaps 68 expand to form a funnel, as shown in the figure. This funnel directs the bore hole liquid 11 through the fluid inlets 69 and the chamber 70 to the turbine inlet 71, causing the rotor 75 thereof to rotate at a speed which depends upon the speed at which the apparatus is moved through the bore hole 12.

So long as the bottom closure member 77 between the two rotor blades 76 is not directly over either of the two pairs of adjacent blades 74 to which the bottom closure members 78 and 78a are secured, water will pass through the turbine 72 and through the outlets 80 and 80a from which it will be jetted radially against the wall of the bore hole 12. The water will also be continuously exhausted through the turbine outlet 81. However, when the bottom closure 77 moves directly over either of the two pairs of adjacent blades 74 to which the bottom closures 78 and 78a are secured, practically no fluid will pass through the corresponding opening 80 or 80a but substantially all the fluid will pass through the other opening and the turbine outlet 81. Accordingly, as the rotor 75 rotates, intermittent and alternate jets of water will be directed from the outlets 80 and 80a, thereby producing a lateral vibration of the casing 66 and periodically varying the pressure of the bore hole liquid 11 at the level of the apparatus in the bore hole.

The variations in the electrofiltration potential produced by the periodic variations in the pressure of the bore hole liquid 11 may be picked up by a pair of insulated electrodes 82 and 83 located on opposite sides of the casing 66 near the outlets 80a and 80, respectively. The electrodes 82 and 83 may be connected to the conductors 33 and 49 in the supporting cable 27 (Fig. 7) to a conventional type rectifier 84 at the surface of the earth, the direct current output of which is impressed upon the recording apparatus 34. The rectifier 84 serves to rectify the periodically varying electrofiltration potential which is produced in the bore hole 12, so that the curve recorded has substantially the shape shown in Fig. 8 of the drawings.

Where a single outlet 80 is employed, the pressure variations produced might be augmented by providing a similar closure member for another pair of adjacent rotor blades 76, preferably at a position diametrically opposite the closure member 77, increasing the number of rotor blades 76, if necessary, to do this. This would, of course, double the frequency of vibration of the apparatus.

Inasmuch as the periodic pressure changes in the modification described above are produced and controlled by mechanical and hydraulic means, there are no current carrying conductors in the supporting cable 27 other than the conductors 33 and 49, which transmit the electrofiltration potentials to the surface of the earth. Accordingly, the electrofiltration potentials picked up may be very accurately measured.

The apparatus illustrated in Fig. 9 of the drawings shows how alternating electrofiltration potentials may be measured simultaneously with potentials that are a function of another subject of interest in the bore hole. While any one of a number of different subjects of interest may be investigated in accordance with the invention, for the sake of convenience, the invention will be described in connection with measurements of the electrical resistivity of earth formations traversed by a drill hole. Moreover, although either direct current, pulsated direct current, or an alternating current of different frequency from the alternating electrofiltration potentials may be employed in such measurements, it will be assumed in the following description that direct current is used. Preferably, the value of the direct current employed should be high enough to render the influence of natural potentials wholly insignificant.

Considering now Fig. 9, the investigating apparatus 85 in the bore hole may comprise any of the modifications described above, such as, for example, the embodiment shown in Fig. 3 of the drawings. Mounted on the apparatus 85 are two spaced apart, insulated electrodes 86 and 87. The electrode 86 is connected through the conductor 26 in the supporting cable 27 to a direct current source of electrical energy 29 at the surface of the earth, the other terminal of which is connected to ground at the point 30. This circuit creates in the intervening earth formations an electric field which impresses upon the electrode 87 a potential that is a function of the electrical resistivity of the formations, as described in the prior United States Patent No. 1,819,923.

Variations in the continuous potential existing at the electrode 87 are transmitted through the conductor 33 in the supporting cable 27 to one terminal of a conventional type filter 92 which passes direct current but discriminates against alternating current, the other terminal of which is connected to ground at the point 35 at the surface of the earth. The output of the filter 92 is fed to a conventional type, continuous current recording instrument 94 which provides a curve that is a function of the electrical resistivity of the formations at different depths in the bore hole.

The alternating electrofiltration potentials produced by variations in the pressure of the bore hole liquid 11 created by the apparatus 85 are also picked up by the electrode 87. These potentials are transmitted through the conductor 33 to one terminal of a second filter 95 which passes alternating current of the frequency of the alternating electrofiltration potentials but discriminates against continuous current, the other terminal of which is connected to the ground at the point 35. The output of the filter 95 is preferably first rectified by means of a conventional rectifier 96, the continuous current output of which is impressed upon a conventional type recording instrument 97 which provides a curve that is a function of electrofiltration potentials in the bore hole.

Instead of obtaining indications simultaneously of alternating electrofiltration potentials and the direct current resistivity of the earth formations, indications might be obtained simultaneously of alternating electrofiltration potentials and of any other subject of interest in the bore hole, such as, for example, the electrical impedance of the formations or of the temperature existing at different depths in the bore hole. In such cases, it is only necessary that the electrical signal which is a function of the different subject of interest in the bore hole be either a direct current signal or an alternating current signal of different frequency from the frequency of the alternating electrofiltration potentials.

In each of the embodiments described above, different measuring circuits are employed for obtaining indications of electrofiltration potentials in a bore hole. It is to be understood that the different measuring circuits shown may be used indifferently with the different embodiments shown, depending on the type of curve desired. For example, in Figure 1, indications of electrofiltration potentials might be obtained by making measurements between the electrode 32 and another electrode located at the same level on the other side of the casing 14 opposite the electrode 32. A measuring circuit of this type is shown in Figure 4 of the drawings. As a further modification, indications might be obtained of the voltages between each of two such electrodes and ground.

The invention thus provides a new and improved method and apparatus for obtaining indications of electrofiltration potentials apart from other continuous potentials that may be present in a bore hole. By producing a localized and periodically variable pressure variation at different depths in the bore hole, continuous electrofiltration potentials may be changed to alternating potentials that can be readily separated from other continuous potentials which may be encountered. Accordingly, the invention enables accurate indications of electrofiltration potentials to be obtained without taking any special precautions even in wells located in the vicinity of relatively strong telluric currents.

The several embodiments described above are intended to be illustrative and not restrictive. Numerous modifications in form and detail may be made in those embodiments within the scope of the following claims.

I claim:

1. A method of locating permeable earth formations traversed by a bore hole containing a column of liquid comprising lowering a body through the bore hole and producing at said body artificially periodically fluctuating pressure at a relatively rapid rate above that to which a direct current meter is appreciably responsive in the said liquid at the level of a relatively permeable formation, thereby creating periodically variable flow of the liquid into the permeable formation to generate variable alternating electrofiltration potentials in the vicinity of said permeable formation, simultaneously lowering an electrode with the said body and in such relation thereto as to be substantially at the same level as the body, placing a second electrode at a position where it is not subject to the same instantaneous, fluctuating, liquid pressure as said first electrode, transmitting to the surface alternating potentials picked up by said electrodes and produced by said generated alternating electrofiltration potentials, and obtaining indications of said alternating potentials.

2. Apparatus for locating permeable earth formations traversed by a bore hole containing a column of liquid comprising a body adapted to be lowered through the bore hole and having means for producing artificially periodically fluctuating pressure at a relatively rapid rate above that to which a direct current meter is appreciably responsive in the said liquid at the level of a relatively permeable formation, thereby creating periodically variable flow of the liquid into the permeable formation to generate variable alternating electrofiltration potentials in the vicinity of said permeable formation, a first electrode assembled to said body so as to be movable at substantially the same level therewith, a second electrode located at a position where it is not subject to the same instantaneous fluctuating liquid pressure as said first electrode, circuit means transmitting to the surface alternating potentials picked up by said electrodes and produced by said generated alternating electrofiltration potentials, and means for providing indications of said alternating potentials.

HENRI-GEORGES DOLL.

REFERENCES CITED

The following references are of record in the file of this patent:

UNITED STATES PATENTS

| Number | Name | Date |
|---|---|---|
| 2,190,686 | Slichter | Feb. 20, 1940 |
| 2,304,051 | Beers | Dec. 1, 1942 |
| 988,537 | Aufiero | Apr. 4, 1911 |
| 2,248,073 | Gage | July 8, 1941 |
| 1,475,385 | Hecht | Nov. 27, 1923 |
| 2,276,613 | Gordon | Mar. 17, 1942 |
| 1,955,815 | Lauterback | Apr. 24, 1934 |
| 1,675,560 | Jubien | July 3, 1928 |
| 2,206,863 | Cloud | July 9, 1940 |
| 2,085,664 | Karcher | June 29, 1937 |
| 2,104,440 | Statham | Jan. 4, 1938 |
| 2,156,259 | Blau | May 2, 1939 |
| 2,181,601 | Jakosky | Nov. 28, 1939 |
| 1,826,961 | Slichter | Oct. 13, 1931 |
| 1,913,293 | Schlumberger | June 6, 1933 |
| 2,132,807 | Rust | Oct. 11, 1938 |